United States Patent

Gable

[15] 3,693,373
[45] Sept. 26, 1972

[54] ABSORPTION REFRIGERATION MACHINE

[72] Inventor: Gerald K. Gable, 7654 Villa Maria, North Syracuse, N.Y. 13212

[22] Filed: Feb. 22, 1971

[21] Appl. No.: 117,274

[52] U.S. Cl. ...................... 62/476, 62/497, 122/33, 165/105
[51] Int. Cl. ..................... F25b 15/04, F22b 1/02
[58] Field of Search .......... 62/148, 476, 497; 122/33; 165/105

[56] References Cited

UNITED STATES PATENTS

| 44,153 | 9/1864 | Bayley | 122/33 |
| 3,254,507 | 6/1966 | Whitlow | 62/497 X |
| 3,520,282 | 7/1970 | Fisher | 62/497 X |
| 464,434 | 12/1891 | Hill | 122/33 X |

FOREIGN PATENTS OR APPLICATIONS

| 454,585 | 2/1949 | Canada | 122/33 |

Primary Examiner—William F. O'Dea
Assistant Examiner—P. D. Ferguson
Attorney—Harry G. Martin, Jr. and J. Raymond Curtin

[57] ABSTRACT

An absorption refrigeration system employing a generator having a heat pipe associated therewith to transfer heat from a suitable burner to the interior of the generator to increase the capacity of the generator without a proportionate increase in the size thereof and to minimize the inside surface temperature of the generator wall.

3 Claims, 1 Drawing Figure

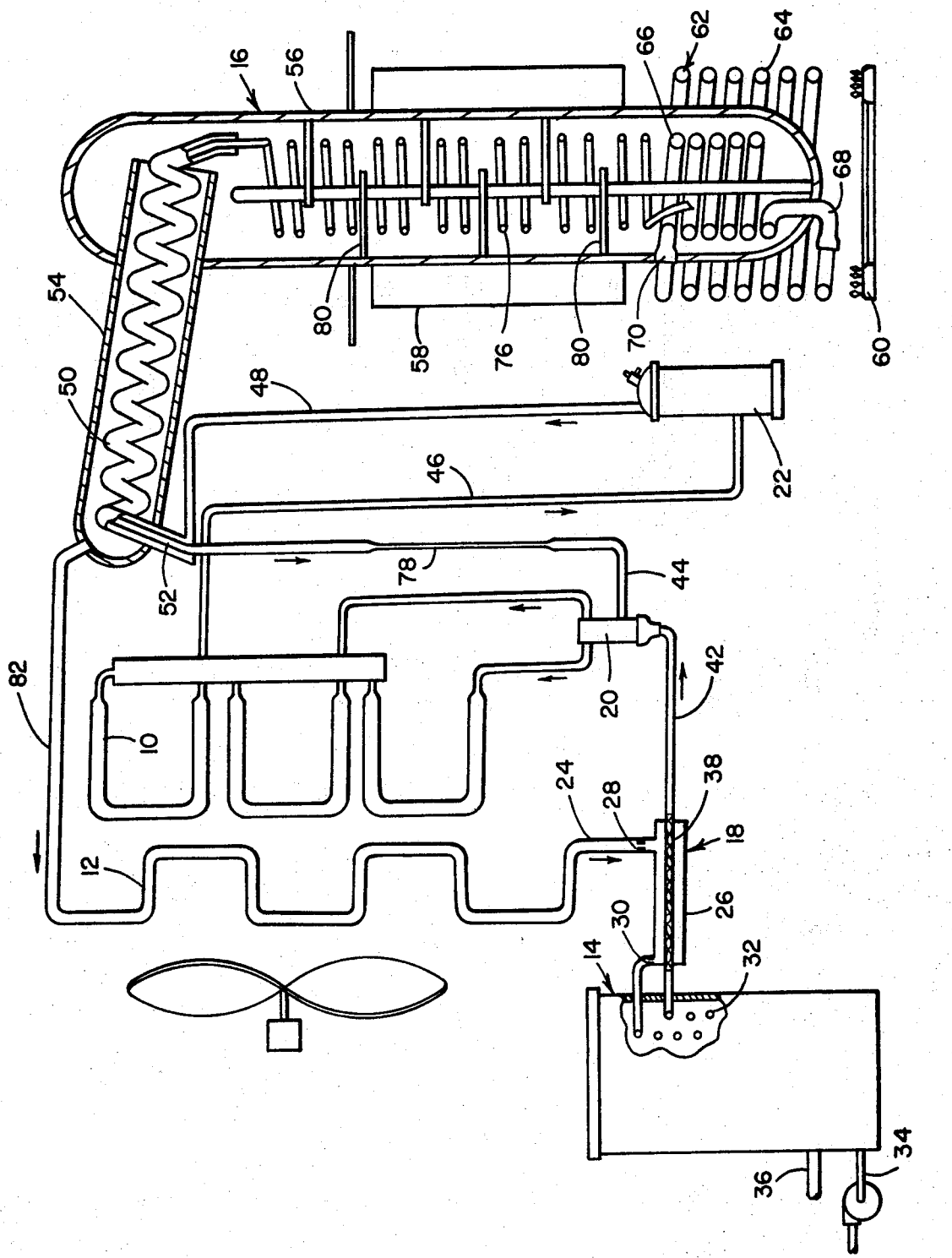

ABSORPTION REFRIGERATION MACHINE

BACKGROUND OF THE INVENTION

In fuel-fired absorption refrigeration machines it is difficult to transfer heat from the flue gas to the solution within the generator without heating the generator wall to a temperature which permits corrosion of the generator and deterioration of the solution therein. For desired machine efficiency, the greatest quantity of heat possible should be transferred from the flue gas to the solution.

One of the common means for accomplishing this purpose is to provide fins on the generator to transfer the heat to the generator wall and subsequently to the solution therein. However, the combustion temperature adjacent the burner is often high enough to oxidize the fins or to produce an excessive generator wall temperature which could accelerate corrosion of the generator and cause premature failure thereof.

SUMMARY OF THE INVENTION

The present invention relates to an absorption refrigeration system comprising a generator, an absorber, a condenser and an evaporator, first tubular heat transfer means disposed adjacent the exterior of the generator, combustion means disposed adjacent the generator and the first heat transfer means for directly heating the generator and the first heat transfer means, and second tubular heat transfer means disposed interiorly of the generator communicating with the first tubular heat transfer means, the first and second heat transfer means being adapted to transfer heat produced by the combustion means to the solution within the generator to heat the solution and increase the amount of heat transferred from the combustion means to the solution without increasing the amount of heat transferred through the generator wall or increasing the inside surface temperature of the wall.

BRIEF DESCRIPTION OF THE DRAWING

The drawing is a schematic diagram of an absorption refrigeration system employing the improved generator of the present invention.

DESCRIPTION OF THE PREFERRED EMBODIMENT

Referring to the drawing, there is shown an absorption refrigeration system comprising an absorber 10, a condenser 12, and evaporator or chiller 14, a generator 16, a liquid-suction heat exchanger 18, and a vapor distributor 20 connected to provide refrigeration. A pump 22 is employed to circulate weak absorbent solution from absorber 10 to generator 16.

As used herein, the term "weak absorbent solution" refers to solution which is weak in absorbent power, and the term "strong absorbent solution" refers to a solution which is strong in absorbent power. A suitable absorbent for use in the system described is water; a suitable refrigerant is ammonia.

Liquid refrigerant condensed in condenser 12 passes through refrigerant liquid passage 24 to the liquid-suction heat exchanger. The liquid-suction heat exchanger 18 includes a housing 26 having a refrigerant restrictor 28 at the upstream end and a refrigerant restrictor 30 at the downstream end thereof. A portion of the liquid refrigerant supplied to the liquid-suction heat exchanger 18 flashes upon passing through restrictor 28 due to the low pressure existing downstream of the restrictor, thereby cooling the remainder of the refrigerant in the housing 26. The cooled refrigerant liquid and flashed refrigerant vapor then pass through restrictor 30 into heat exchanger 32 of chiller 14.

A heat exchange medium such as water is passed over the exterior of heat exchanger 32 where it is chilled by giving up heat to evaporate the refrigerant within the heat exchanger. The chilled heat exchange medium passes out of chiller 14 through line 34 to suitable remote heat exchangers (not shown) after which it is returned to the chiller through inlet 36 for rechilling.

The cold refrigerant evaporated in heat exchanger 32, along with a small quantity of absorbent which is carried over to the chiller with the refrigerant from the generator, passes into refrigerant vapor passage 38 of liquid-suction heat exchanger 18. The refrigerant vapor and absorbent liquid, which has a large quantity of refrigerant absorbed therein, passes through refrigerant vapor passage 38 in heat exchange relation with the refrigerant passing through housing 26. Refrigerant vapor and absorbent solution from passage 38 passes to refrigerant distributor 20 through line 42. The refrigerant vapor and absorbent solution from line 42 are mixed with solution from the generator 16 which is supplied to to the distributor through line 44.

The absorbent solution-refrigerant vapor mixture from distributor 20 is supplied to absorber 10 where a cooling medium, preferably ambient air, is passed over the surface of the absorber in heat exchange relation with the solution therein for cooling the absorbent solution to promote the absorption of the refrigerant vapor by the solution. The same cooling medium may be supplied to condenser 12 in heat exchange relation with refrigerant vapor therein to condense the refrigerant.

Cold weak absorbent solution passes from absorber 10 through line 46 into the pump 22. Liquid from pump 22 is passed through line 48 to rectifier heat exchange coil 50. The weak solution passes through coil 50 in heat exchange relation with hot strong solution passing through heat exchange coil 52 disposed within coil 50 and with the hot refrigerant vapor flowing through rectifier shell 54 in contact with the outer surface of coil 50. The weak solution from coil 50 is discharged into the upper portion of generator 16 along with any vapor which is formed in coil 50 due to heat exchange with the hot vapor passing thereover and the hot solution flowing therethrough.

Generator 16 comprises a shell 56 having fins 58 suitably affixed thereto as by welding. The generator is heated by a gas burner 60 or other suitable heating means. A heat exchanger or heat pipe 62 comprising a coil 64 external of the generator and a coil 66 on the interior of the generator is provided to transfer heat from the burner 60 to the solution within generator 16. The heat pipe 62 is formed of a suitable material such as stainless steel which is resistant to corrosion at the high temperature produced by the burner 60. The heat pipe is partially filled with a suitable heat exchange medium such as distilled water. The heat from burner 60 vaporizes the heat exchange medium in coil 64. The vapor from coil 64 passes through fitting 70 into coil 66 within the generator where it is condensed by giving up heat to the solution in the generator. The condensed heat exchange medium from coil 66 passes through drain line 68 to coil 64 where it is again vaporized for subsequent passage through line 70 to coil 66.

By locating the outer coil of the heat pipe in close proximity to the lower surface of the generator vessel, the heat from the burner is transferred both to the generator and to the outer coil of the heat pipe. The total surface area exposed to the flue gas, which includes both the exterior surface of the generator and the exterior surface of the outer heat pipe coil, provides a large heat exchange surface for transferring heat from the flue gas. The increased quantity of heat transferred from the flue gas to the total heat exchange surface results in decreased flue temperatures. At the same time, the increased surface area exposed to the flue gas and the efficient transfer of heat therefrom to the solution within the generator through the interior coil of the heat pipe, results in increased heat input to the generator without an increase in generator inside wall temperature.

The heat transfer surface within the generator is also increased by the use of a heat pipe since the total surface exposed to the solution within the generator includes both the interior wall surface of the generator and the surface of the inner coil of the heat pipe. A greater quantity of liquid is exposed to the increased interior heat transfer surface, thereby allowing a greater quantity of heat to be transferred thereto.

For a given heat input, as the heat transfer surface is increased, the surface wall temperature decreases. The exterior coil of the heat pipe in conjunction with the exterior wall of the generator provides increased heat transfer surface to extract more heat from the flue gas while at the same time, the increased heat transfer surface area exposed to the solution within the generator allows the increased quantity of heat obtained from the flue gas to be transferred to the solution at a lower temperature than has heretofore been possible with direct fired absorption machines.

The temperature of the solution within the generator is ordinarily a function of the boiling point of the solution at the pressures existing within the machine. However, since a large quantity of heat must be transferred to the solution, the solution nearest the heat transfer surface may be heated to a temperature substantially above the boiling point. By increasing the heat exchange surface area within the generator, a greater quantity of heat may be transferred to the solution while maintaining the solution adjacent the heat exchange surface at a temperature nearer the boiling point of the solution. Therefore, by utilizing the heat pipe, the generator wall temperature and the temperature of the solution within the generator is reduced, while at the same time the flue gas temperature discharged from the generator is also reduced. Thus, a greater quantity of heat is supplied to the solution than has been possible heretofore even though the temperature of the solution and the generator wall is materially reduced.

The weak solution which is boiled in generator 16 concentrates the solution, thereby forming strong solution and refrigerant vapor.

The hot strong absorbent solution passes upwardly through the analyzer section of generator 16, through analyzer coil 76 in heat exchange with the weak solution passing downwardly over the coil. The warm strong solution then passes through heat exchange coil 52 within coil 50 and line 44 into the distributor 20. A restrictor 78 is provided in line 44 so that the solution supplied to the vapor distributor 20 is at the same pressure as the vapor in line 42.

Refrigerant vapor formed in generator 16 passes upwardly through the analyzer section thereof where it is concentrated by mass heat transfer with weak solution passing downwardly over analyzer coil 76. Analyzer plates 80 in generator 16 provide a tortuous path for flow of solution and vapor to assure intimate contact therebetween to improve the mass heat transfer. The vapor then passes through rectifier 54 in heat exchange relation with the weak solution passing through coil 50. Absorbent condensed in rectifier 54 flows downwardly into the generator along with the weak solution discharged from coil 50. Refrigerant vapor passes from rectifier 54 through line 82 to condenser 12 to complete the refrigeration cycle.

While I have described a preferred embodiment of my invention, it is to be understood that the invention is not limited thereto since it may be otherwise embodied within the scope of the following claims.

I claim:

1. An absorption refrigeration system including a cylindrical generator, an absorber, a condenser, and an evaporator, said generator being adapted to receive solution to be vaporized;
   first tubular heat transfer means comprising a tubular coil encircling the exterior of said generator and spaced therefrom to form an annulus between said coil and said generator;
   combustion means disposed adjacent said first tubular heat transfer means and said generator for heating the walls of said generator and said first tubular heat transfer means, passage of flue gas through said annulus heating the walls of said generator and said tubular coil;
   second tubular heat transfer means disposed interiorly of said generator communicating with said first tubular heat transfer means for transferring heat from said first tubular heat transfer means to said second tubular heat transfer means to increase the amount of heat transferred to the solution inside said generator and minimize the quantity of heat transferred from said combustion means through the walls of said generator to solution therein, thereby minimizing the inside surface temperature of the walls of said generator.

2. An absorption refrigeration system according to claim 1 wherein said second tubular heat transfer means comprises a tubular coil disposed in the lower portion of said cylindrical generator.

3. An absorption refrigeration system according to claim 2 wherein said first and second tubular heat transfer means contain a heat exchange fluid for circulation therein, said heat exchange fluid when cool occupying only a portion of the space within said coils.

* * * * *